United States Patent [19]
Terumoto

[11] Patent Number: 5,530,570
[45] Date of Patent: Jun. 25, 1996

[54] COLOR LIQUID CRYSTAL DISPLAY ARRANGEMENT WITH ELONGATED COLOR FILTERS

[75] Inventor: Koji Terumoto, Kyoto, Japan

[73] Assignee: Rohm Co., Ltd., Kyoto, Japan

[21] Appl. No.: 273,693

[22] Filed: Jul. 12, 1994

[30] Foreign Application Priority Data

Oct. 15, 1993 [JP] Japan ................................ 5-258747

[51] Int. Cl.⁶ .................................................. G02F 1/1335
[52] U.S. Cl. ........................................................ 359/68
[58] Field of Search .................................................. 359/68

[56] References Cited

U.S. PATENT DOCUMENTS

| | | | |
|---|---|---|---|
| 4,902,103 | 2/1990 | Miyake et al. | 359/54 |
| 4,950,058 | 8/1990 | Diem et al. | 359/68 |
| 5,040,875 | 8/1991 | Noguchi | 359/68 |
| 5,132,830 | 7/1992 | Fukutani et al. | 359/68 |
| 5,142,392 | 8/1992 | Ueki et al. | 359/68 |
| 5,144,288 | 9/1992 | Hamada et al. | 359/68 |

*Primary Examiner*—William L. Sikes
*Assistant Examiner*—Charles Miller
*Attorney, Agent, or Firm*—Brumbaugh, Graves, Donohue & Raymond

[57] ABSTRACT

A color liquid crystal display arrangement has three different color filters in each pixel with the different color filters arranged so that they are not adjacent to each other. The electrodes corresponding to the color filters of the same color are connected to a single terminal by a common wire, and the common wires for the electrodes corresponding to the different color filters are arranged so that they do not cross one another within the display area.

5 Claims, 4 Drawing Sheets

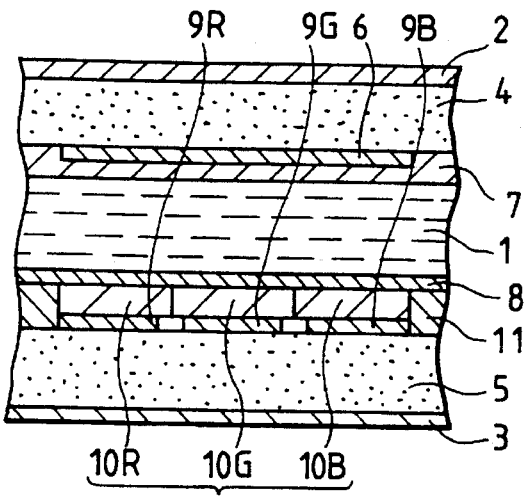

COLOR LIQUID CRYSTAL DISPLAY ARRANGEMENT WITH ELONGATED COLOR FILTERS

BACKGROUND OF THE INVENTION

The present invention relates to color liquid crystal display arrangements and, more particularly, to color liquid crystal display arrangements which can be driven at a low duty cycle and can provide images of high quality.

Liquid crystal display arrangements for displaying color images include a color filter set in which three filters for three different colors, i.e., red (hereinafter referred to as "R"), green ("G") and blue ("B"), are provided on a transparent substrate for every image pixel, and a guest/host crystal type containing a two-color dye dissolved in a host liquid crystal.

FIG. 5 is a cross-sectional view showing one pixel portion of a color liquid crystal display arrangement having color filters. In FIG. 5, a liquid crystal layer 1 formed of a twist nematic-type material or the like is confined between two transparent substrates 4 and 5. A transparent electrode 6 and an orientation film 7 are mounted on the side of one transparent substrate 4 facing the crystal layer 1. On the side of the other transparent substrate 5 facing the liquid crystal 1, R, G and B color filters 10R, 10G and 10B, respectively, and electrodes 9R, 9G and 9B corresponding to the color filters 10R, 10G and 10B are mounted, and black masks 11 are provided between pixel electrodes. In addition, an orientation film 8 is located on the above components. Two polarizing plates 2 and 3 are disposed on the outer sides of the transparent substrates 4 and 5 opposite the liquid crystal layer sides.

The color filters 10R, 10G and 10B are arranged in one of the several patterns shown in plan view in FIGS. 6(a)–6(d), that is, the color filters 10R, 10G and 10B may be disposed in a mosaic type of arrangement shown in FIG. 6(a), in which the color filters are sequentially shifted in position; a triangle type of arrangement shown in FIG. 6(b); a stripe type of arrangement shown in FIG. 6(c); or they may be disposed in a four-pixel type of arrangement shown in FIG. 6(d) or the like.

It will be apparent from studying FIGS. 6(a), 6(b) and 6(d) that, when the R, G and B color filters are arranged alternately in a mosaic manner, the wires used to connect electrodes of the same color together cannot be arranged so that they do not cross each other. If the wires used to connect the electrodes for R, G and B cross one another, however, then both of the colors corresponding to the crossed wires are turned on in the crossing portions thereof. In addition, the wires must be arranged to cross at two levels separated by an insulation film to prevent the two wires from being short-circuited, which greatly increases the production time and also lowers the reliability of the display arrangement. Therefore, to drive a liquid crystal display device in which this color filter arrangement is provided, the electrodes corresponding to the color filters arranged in a matrix manner are connected in a row or column direction and a periodic drive is carried out which applies a pulse voltage for every row or column of image pixels. For example, if a liquid crystal display panel has an array of 24×24 pixels and each pixel requires three color electrodes, R, G and B, when the electrodes are provided for every row or every column of pixels, then 24×3=72 electrodes are necessary, which in turn requires a high duty cycle, i.e., 1/72, for each pixel color.

However, as the duty cycle increases, the brightness difference between adjacent display pixels to which a voltage is applied and nondisplay pixels to which no voltage is applied is decreased. As a result, a clear image cannot be obtained and the quality of display is reduced.

On the other hand, as shown in FIG. 6(c), in a stripe-type arrangement in which the color filters of the same color are arranged in columns, if the electrodes in each column are connected with one another and corresponding wires extend away from the display screen so that different wires cross one another only outside of the display area, then only three terminals are required to connect the electrodes corresponding to the same color for the pixels formed on the transparent substrate, i.e., R, G and B electrode terminals. However, because the filters of the same color follow one another in each column, a partial color display is produced and, in particular, when two or more colors are mixed together, a uniform mixed color cannot be obtained.

SUMMARY OF THE INVENTION

Accordingly, it is an object of the invention to provide a color liquid crystal display arrangement which overcomes the drawbacks encountered in the conventional color liquid crystal display arrangements.

Another object of the invention is to provide a color liquid crystal display arrangement in which electrodes corresponding to color filters of the same color for pixels are connected together and to a corresponding terminal, requiring only the same number of terminals as the number of colors for the color filters so that the pixel colors can be driven periodically at a low duty cycle, such as ⅓, while assuring that, even if different color filters are mixed, a high-resolution color display can be obtained.

These and other objects of the invention are attained by providing a color liquid crystal display arrangement in which a liquid crystal layer is confined between two transparent substrates and three or more color filters forming each pixel and electrodes corresponding to the color filters are formed in one of the transparent substrates. In one embodiment according to the invention, the color filters of the same color are arranged in the respective pixels so that they do not adjoin one another and a common connection portion is provided to which electrodes corresponding to the color filters of the same color are connected by their own wire. Moreover, the color filters are disposed so that the wire for connecting the electrodes of the color filters of the same color does not cross wires for connecting the electrodes of the color filters of different colors in the display screen.

The above-mentioned color filters of three or more colors include first, second and third colors, and these three color filters are provided as a color unit. Preferably, in the color unit, the color filters of the first and second colors are arranged so as to adjoin each other, and the color filter of the third color is positioned with respect to the other two color filters so that it has an adjoining side disposed adjacent to both of the other color filters.

Preferably, the electrodes of the adjoining color filters of the first and second colors included in the color unit extend parallel to the line between those filters, and the electrode of the color filter of the third color is connected by a wire extending between the first and second color electrodes. With this arrangement, it is possible to connect the electrodes corresponding to the color filters of the same color together and, also, a uniform mixed color can easily be obtained.

In order to distribute a color uniformly within a pixel, preferably two color units of the above-described type are arranged so as to adjoin each other in a first direction and two color units of a different type, in which the position of the color filter of the third color is reversed with respect to the color filters of the first and second colors when compared with the color units of the above-described type, are also arranged so as to adjoin each other in the first direction, and the two color units of each type are disposed parallel to each other in the first direction and side-by-side to provide a pixel.

Alternatively, another arrangement may be provided in which color filters formed in a stripe shape are arranged in the order of a first color, a third color, a second color, a third color, a first color, a third color, and a second color to form a pixel and in which the electrodes corresponding to the color filters of the same color are connected with each other by a common wire. This arrangement is preferable in that it is easy to connect the electrodes corresponding to the color filters of the same color together and to obtain a uniform mixed color.

Because the electrodes corresponding to the color filters of the same color are connected to one another by their own common wire and the common wires for connecting electrodes corresponding to the color filters of different colors do not cross one another within a display area, the display arrangement of the invention eliminates the possibility that the display colors in the different wire portions might be mixed together to degrade the display characteristics of the display device. Also, since the number of electrode terminals can be set equal to the number of different colors of the color filters, the color liquid crystal display arrangement of the invention can be operated at a low duty ratio so that a clear, high-resolution display picture can be obtained.

Further, because the color filters of the same color are not aligned, a uniform color can be obtained even if a mixed color is displayed. Also, since two or more filters of the same color are provided within each pixel, the color displayed by the pixel is uniform.

BRIEF DESCRIPTION OF THE DRAWINGS

Further objects and advantages of the invention will be apparent from a reading of the following description in conjunction with the accompanying drawings, in which:

FIG. 5 is a fragmentary cross-sectional view showing a portion of a conventional color liquid crystal display device; and FIGS. 6(a)–6(d) are plan views showing examples of the disposition of arrays of color filters in conventional color liquid crystal display devices.

DESCRIPTION OF PREFERRED EMBODIMENTS

Figure 1A:
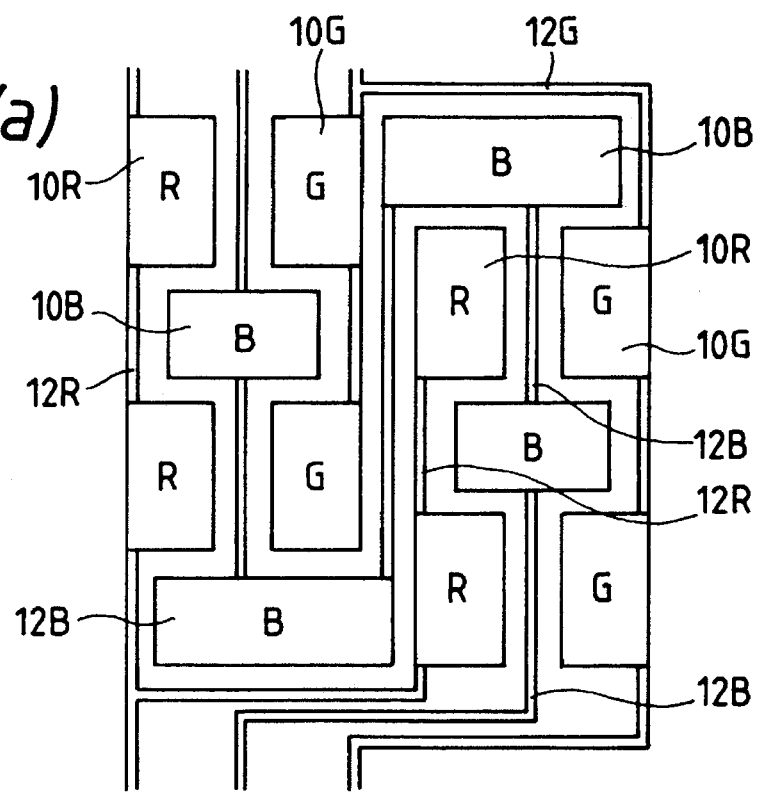
FIG. 1(a) is a plan view showing the disposition of color filters employed in a first representative embodiment of a color liquid crystal display arrangement according to the invention.
Figure 1B:
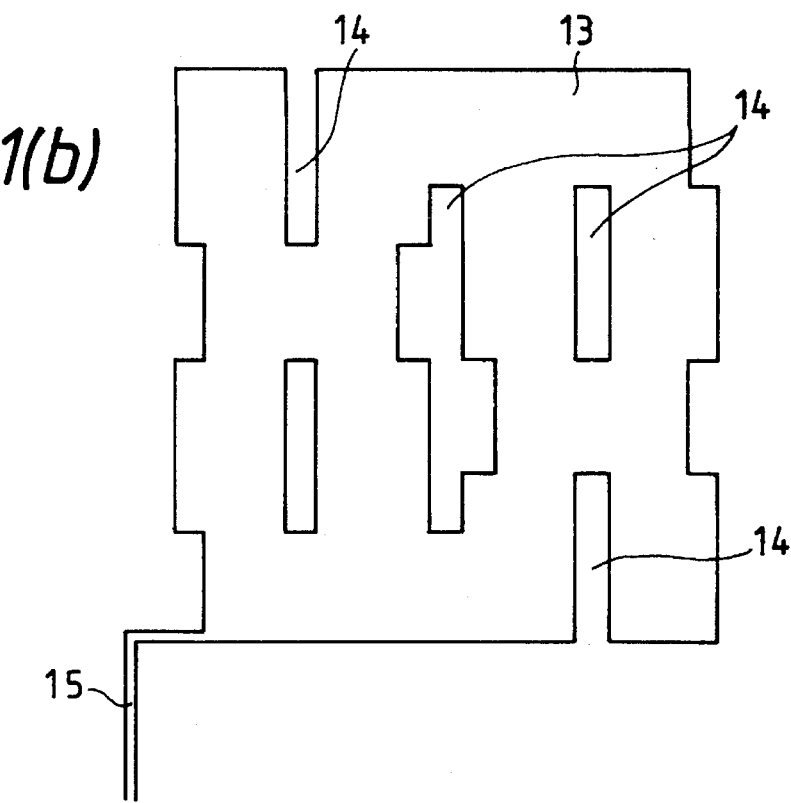
FIG. 1(b) is a plan view showing a segment electrode which is disposed opposite the color filters of FIG. 1(a)
Figure 2:
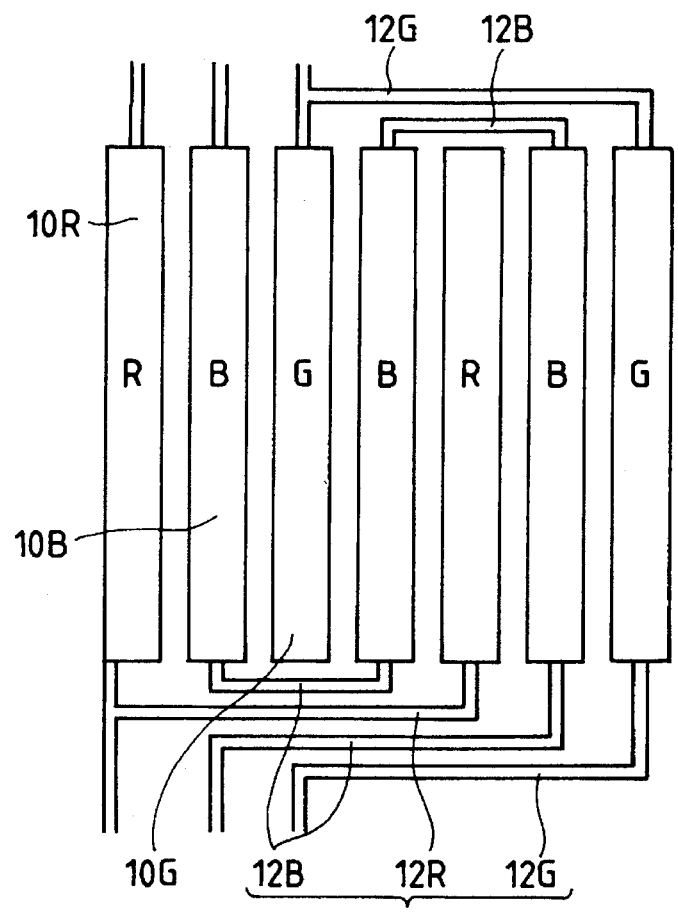
FIG. 2 is a plan view showing the disposition of color filters employed in a second representative embodiment of a color liquid crystal display arrangement according to the invention.

Representative embodiments of color liquid crystal display devices according to the invention are described herein with reference to the drawings. FIG. 1(a) shows the arrangement of color filters corresponding to one pixel provided in one of two transparent substrates employed in a color liquid crystal display arrangement having regions selectively activated by electrodes corresponding to the color filters and also illustrates the arrangement of the common wires used to connect the electrodes. FIG. 1(b) shows the pixel selection electrode provided in the other transparent substrate corresponding to the pixel shown in FIG. 1(a). FIG. 2 shows the arrangement of color filters corresponding to a pixel provided in one transparent substrate employed in another typical embodiment of a color liquid crystal display arrangement according to the invention.

Referring to FIG. 1(a), three filters 10R, 10G and 10B, which transmit the three primary colors, red ("R"), green ("G") and blue ("B"), respectively, are selectively exposed by the liquid crystal when the corresponding electrodes are activated. In this embodiment, the red and green color filters 10R and 10G and their corresponding electrodes adjoin each other, and each has a rectangular shape with longer sides adjacent to each other and they are spaced in the horizontal direction. The blue color filter 10B and its corresponding electrode are rectangular in shape with the longer side extending horizontally, and they are positioned below and spaced downwardly from the color filters 10R and 10G so that the color filter 10B has an adjoining side facing both of the color filters 10R and 10G, and the three adjacent filters 10R, 10G and 10B form one color filter unit. This one unit may be used as a pixel but, in the present embodiment, four of these units are arranged to form a pixel.

In this case, a pixel is formed by two of the above-described units disposed adjacent to each other in vertically-spaced relation and two further vertically-spaced color units of a different type are positioned horizontally adjacent to the first two units. In the latter color units, the position of the blue color filter 10B is reversed with respect to the locations of the red and green color filters 10R and 10G when compared with the first color units described above, and these units are also spaced in the vertical direction so as to adjoin each other. With this arrangement, the electrodes for each of the three colors R, G and B can be connected by corresponding common wires 12R, 12G and 12B, which do not cross one another. Also, the wires 12R, 12G and 12B extend in the vertical direction and can therefore be connected to the corresponding electrodes of the same colors in other pixels located vertically above and below the illustrated pixel.

Figure 3:
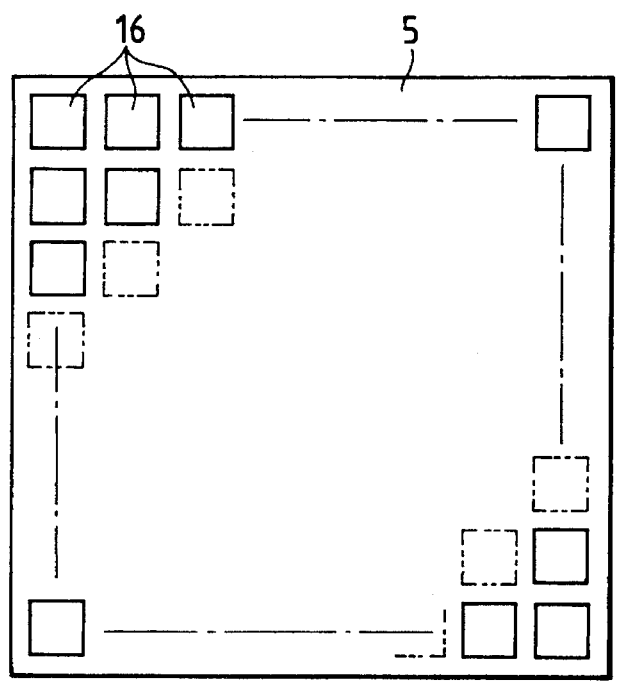
FIG. 3 is a plan view showing an array of pixels formed in a transparent substrate.

FIG. 3 shows an arrangement in which twelve columns, each having twelve vertically-aligned pixels 16, are arranged in the transparent substrate 5. As a result, the electrodes corresponding to each of the colors R, G and B of the pixels aligned in the vertical direction are connected by the wires 12R, 12G and 12B, respectively, so that the wires do not cross any wires corresponding to other colors, and the wires 12R, 12G and 12B extend vertically to the end portions of the transparent substrates.

Since the end portions of the two transparent substrates are disposed outside the sealing agent sections that hold the liquid crystal layer between the transparent substrates and are bonded thereto, even if the wires connecting the electrodes of the respective colors cross one another separated by insulation films in the end portions, a display image will not be affected by such crossed connections. Therefore, the end portions of the two transparent substrates can include a common connection portion to which the common wires for the colors R, G and B are connected and only three terminals, for the colors R, G and B, respectively, are necessary. As a result, even if the pixels in the display arrangement are driven periodically, they can be driven at a low duty cycle so that a clear display image can be obtained.

Moreover, with this arrangement, the sizes of the rectangular shapes of the color filters 10R, 10G and 10B for each of the colors need not be the same, and the relative sizes of the filters for a color such as blue, which has a lower visual response characteristic, may be larger in order to provide a uniform overall display appearance. For example, as shown in FIG. 1(*a*), the total area of the filters 10B is larger than that of the filters 10R and 10G. In the above-described embodiment, the color filter of the third color (blue) in one unit of color filters is arranged below the color filters of the first and second colors (red and green) but, if desired, the third color filter may be located above the first and second color filters.

Furthermore, color filters 10R, 10G and 10B may or may not be provided in the regions above or below the common wires 12R, 12G and 12B connecting the respective electrodes. Also, the wires connecting the electrodes may be made of the same material as the electrodes, such as an ITO film, an $SnO_2$ film or a similar transparent conductive film, and may be formed simultaneously with the electrodes. In this case, however, the width of the wire should be relatively large, i.e., on the order of 30 μm. In order to reduce the nondisplay area of the display device if no color filters are provided above or below the connecting wires, those wires may be made of chromium with a width on the order of 3 μm.

FIG. 1(*b*) is a view showing a one-pixel portion of a segment electrode 13 which is provided in the other transparent substrate disposed opposite to the above-described transparent substrate containing the filters, as viewed from the same side as the color filters shown in FIG. 1(*a*). In other words, FIG. 1(*b*) is a view arranged so that, if FIGS. 1(*a*) and 1(*b*) are superimposed on each other, the filter and electrode arrangements will be the same as they are in a display panel.

As shown in FIG. 1(*b*), the segment electrode 13 has open portions 14 to prevent the electrodes corresponding to the colors shown in FIG. 1(*a*) from activating the liquid crystal in the portions thereof adjacent to the wires 12R, 12G and 12B, that is, the segment electrode is partly cut away to prevent a voltage from being applied across the liquid crystal layer in those regions. However, where the wires do not cross each other and the electrodes are arranged to activate the liquid crystal adjacent to the wire portions, the open portions 14 need not be formed in the segment electrode and it is possible to use a square or rectangular segment electrode. In the illustrated embodiment, for each segment electrode 13, an electrode terminal 15 is independently connected to the end portion of the transparent substrate.

Although FIGS. 1(*a*) and 1(*b*) show only the arrangements of the color filters 10R, 10G and 10B provided in one of the transparent substrates and the electrodes corresponding to the color filters, as well as the shape of the segment electrode 13 provided in the other transparent substrate, the structure of the remaining portions of the present embodiment of the display arrangement is the same as the structure shown in FIG. 5. Thus, the liquid crystal layer 1 is held by and between the two transparent substrates 4 and 5 and electrode films 6, 9R, 9G and 9B, and orientation films 7 and 8 and the like are provided in the two transparent substrates, and polarizing plates 2 and 3 are also provided on the outside surfaces of the transparent substrates.

Referring now to FIG. 2, another embodiment of a color liquid crystal filter display arrangement according to the invention includes color filters 10R, 10G and 10B formed in a long vertical stripe shape and electrodes correspondingly shaped. In addition, the stripe filters are arranged in the order of a first color filter 10R, a third color filter 10B, a second color filter 10G, a third color filter 10B, a first color filter 10R, a third color filter 10B, and a second color filter 10G in the horizontal direction. With this arrangement, as shown in FIG. 2, the electrodes corresponding to each color can be connected to each other by one of the wires 12R, 12B and 12G in such a way that the wires do not cross each other. Also, the wires extend upwardly and downwardly from the pixel so that the color filters of the corresponding colors in pixels above and below the illustrated pixel can be connected to each other by the same wires and electrodes corresponding to the same pixel colors which are spaced horizontally from the illustrated pixel and can be connected in the end portion of the transparent substrate located outside the display area in the manner described above with respect to the first embodiment shown in FIGS. 1(*a*) and 1(*b*). Consequently, the pixel electrodes can be connected to three electrode terminals corresponding to the three colors R, G and B, as described with respect to the first embodiment. Moreover, even when the display pixel colors are driven periodically, they can be driven at a low duty cycle, for example, a ⅓ duty cycle, thereby permitting the display arrangement to provide a clear image. In addition, since each pixel has several filters of each color which are not adjacent to each other, a uniform color display can be provided in every pixel.

According to the typical arrangement utilized in the second embodiment, there is one more color filter 10B of the third color than of the first and second colors. As a result, when the three primary colors R, G and B are used, if the third color filter 10B is blue and the first and second color filters 10R and 10G are red and green, then the area of blue color, which has a lower visual response characteristic, can be increased and thus the whole color display can be seen uniformly. If desired, the widths of the different color stripes can be changed for the same purpose.

The relation between the color filters and the corresponding electrodes will now be described with reference to FIGS. 4(*a*)–4(*c*). In FIG. 4(*a*), three electrodes 9R, 9G and 9B, which correspond to the three color filters, are formed on the transparent substrate 5, and the three color filters 10R, 10G and 10B are formed on the corresponding electrodes 9R, 9G and 9B. To produce the electrodes 9R, 9G and 9B, a transparent conductive film, such as an ITO film, an $SnO_2$ film or a similar film, is formed by sputtering or the like and then patterned on the substrate and the color filters are formed by an ink printing method or by a similar method. Although not shown, an orientation film formed of polyimide or the like is formed on the color filters.

Figure 4A:
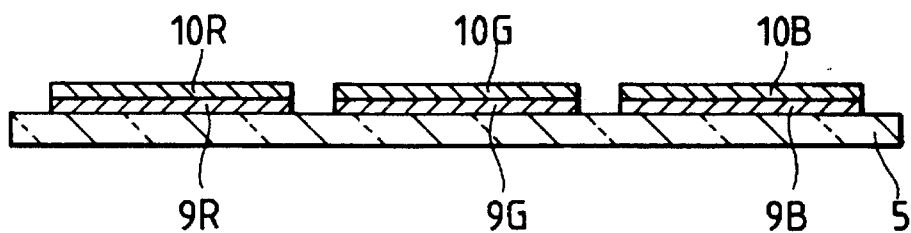
FIGS. 4(a), 4(b) and 4(c) are fragmentary sectional views of a color liquid crystal display showing the disposition of color filters and electrodes formed on a transparent substrate.
Figure 4B:
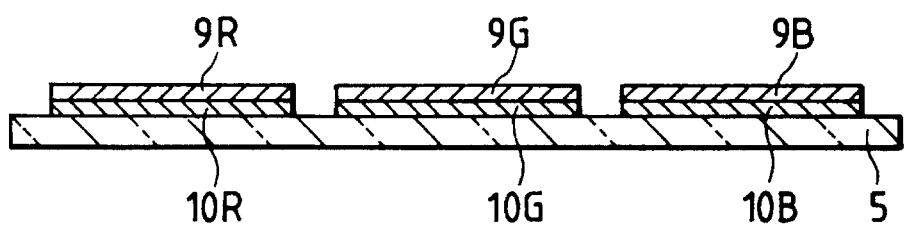
Figure 4C:
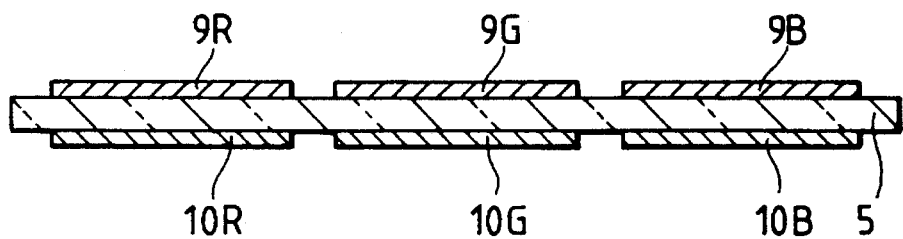

In the alternate arrangement shown in FIG. 4(*b*), the color filters 10R, 10G and 10B are formed first by printing them on the transparent substrate 5, and the electrodes 9R, 9G and 9B are then formed on the filters. The relative positions of the color filters 10R, 10G and 10B and the electrodes 9R, 9G and 9B may be arranged as shown in either FIG. 4(*a*) or FIG. 4(*b*). Also, as shown in FIG. 4(*c*), the color filters 10R, 10G and 10B may be formed, if desired, on the side of the transparent substrate 5 which is opposite to the liquid crystal layer. Although not shown in FIGS. 4(a)–4(c), an orientation film or the like similar to that of FIG. 5 is provided on the surfaces of the color filters or the electrodes 9R, 9G and 9B facing the liquid crystal layer. Accordingly, when a liquid crystal layer is confined between the thus-formed transparent substrate 5 and another transparent substrate 4 with a segment electrode 6 or the like formed thereon, a liquid crystal display device is provided such as is shown in FIG. 5.

In the embodiments of the invention described above, the color filters correspond to the three primary colors R, G and B because the three primary colors R, G and B can display any arbitrary color if they are combined appropriately. However, the invention is not limited to using filters having the three primary colors, but filters having other colors can also be used instead. Also, even if four or more different color filters are used, the electrodes relating to the same color can be connected in such a way that they do not cross one another so that the number of electrode terminals used can be equal to the number of colors used. Consequently, even when four or five different color filters are used, for example, the display device can be operated at a low duty cycle, that is, it can be driven at a ¼ or a ⅕ duty cycle.

As described above, because the invention provides an arrangement in which the electrodes corresponding to the color filters of the same color for at least three different colors are connected together by their wires and are connected to terminals in the end portion of the transparent substrate, the number of the electrode terminals may be the same as the number of colors. Thus, when the color pixels are activated periodically, the display arrangement can be operated at a low duty cycle. As a result, the boundary between the active areas and the inactive areas in the display is sharp, which enables the display to provide a clear image and also enhances the quality of the display.

Further, since the display device can be driven at a low duty cycle, a twist-type nematic liquid crystal can be used, resulting in improved image contrast compared with the contrast produced by a super-twist-type nematic liquid crystal which must be used when a high duty cycle is required. In addition, the liquid crystal display device of the invention can be used over a wide range of temperatures, from –40° C. to 90° C., and it can be manufactured easily at low cost.

Further, since the total areas of each of the different color filters in each of the pixels can be changed, the area of a color which has a low visual response characteristic can be increased to provide a uniform mixed color, and thus a natural color can be obtained easily. In addition, because color filters having the same color can be located in several portions of each pixel, the whole pixel appears to display the same color, which allows a full dot color display.

Although the invention has been described herein with reference to specific embodiments, many modifications and variations therein will readily occur to those skilled in the art. Accordingly, all such variations and modifications are included within the intended scope of the invention.

What is claimed is:

1. A color liquid crystal display arrangement comprising a liquid crystal layer disposed between two transparent substrates to provide a display area including a plurality of image pixels, each having at least three different color filters and corresponding electrodes formed on one of the transparent substrates, at least two different color filters in each pixel being elongated in directions transverse to each other, the color filters of the same color in the pixels provided on the transparent substrate being arranged so that they do not adjoin one another, and the electrodes corresponding to each color being connected by a common wire so that none of the common wires for different colors cross each other within the display area.

2. A color liquid crystal display arrangement according to claim 1 wherein the color filters for each pixel include a color unit comprising first, second and third color filters of different colors, and wherein first sides of the first and second color filters adjoin each other and extend in a first direction and the third color has one side extending in a second direction and adjoining second sides of both the first and second color filters.

3. A color liquid crystal display arrangement according to claim 2 wherein adjoining sides of the electrodes corresponding to the first sides of the first and second color filters extend in the first direction and the electrodes are connected to corresponding color electrodes in an adjacent color unit by wires extending in the first direction, and the electrodes corresponding to the third color filter in adjacent units are connected by a wire extending between the electrodes corresponding to the first and second color filters.

4. A color liquid crystal display arrangement according to claim 2 including first and second color units, each having the same arrangement of the first, second and third color filters and arranged to adjoin each other in the first direction, and third and fourth color units having the location of the third color filter with respect to the first and second color filters reversed with respect to the arrangement of the first and second color units, the first and second color units being aligned in the first direction and the third and fourth color units also be aligned in the first direction and being disposed adjacent to the first and second color units in the second direction to form a pixel.

5. A color liquid crystal display arrangement comprising a liquid crystal layer disposed between two transparent substrates to provide a display area including a plurality of image pixels, each having at least three different color filters and corresponding electrodes formed on one of the transparent substrates, the color filters of the same color in the pixels provided on the transparent substrate being arranged so that they do not adjoin one another, and the electrodes corresponding to each color being connected by a common wire so that none of the common wires for different colors cross each other within the display area, wherein the color filters for each pixel include a color unit comprising first, second, and third color filters of different colors, and wherein first sides of the first and second color filters adjoin each other and extend in a first direction and the third color has one side extending in a second direction and adjoining second sides of both the first and second color filters.

* * * * *